United States Patent
Kol et al.

(10) Patent No.: US 11,044,079 B2
(45) Date of Patent: Jun. 22, 2021

(54) ENHANCED KEY AVAILABILITY FOR DATA SERVICES

(71) Applicant: Microsoft Technology Licensing, LLC, Redmond, WA (US)

(72) Inventors: Ayla Kol, Sammamish, WA (US); Kameshwar Jayaraman, Redmond, WA (US); Yoganand Rajasekaran, Bothell, WA (US); Jaclynn Hiranaka, Seattle, WA (US); Girish Nagaraja, Kirkland, WA (US); Nikhil Aggarwal, Seattle, WA (US); Paul Howard Rich, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 16/388,905

(22) Filed: Apr. 19, 2019

(65) Prior Publication Data
US 2020/0099519 A1    Mar. 26, 2020

Related U.S. Application Data (60) Provisional application No. 62/736,049, filed on Sep. 25, 2018.

(51) Int. Cl.
| | | |
|---|---|---|
| *H04L 29/06* | (2006.01) | |
| *H04L 9/08* | (2006.01) | |
| *G06F 21/60* | (2013.01) | |
| *G06F 21/62* | (2013.01) | |

(52) U.S. Cl.
CPC .......... *H04L 9/0822* (2013.01); *G06F 21/602* (2013.01); *G06F 21/6209* (2013.01); *G06F 21/6218* (2013.01); *H04L 9/083* (2013.01); *H04L 9/0825* (2013.01); *H04L 9/0894* (2013.01); *G06F 2221/2131* (2013.01)

(58) Field of Classification Search
CPC ... H04L 9/0894; H04L 9/0822; H04L 9/0825; H04L 9/083; G06F 21/602; G06F 21/6209; G06F 21/6218; G06F 2221/2131
See application file for complete search history.

(56) References Cited

U.S. PATENT DOCUMENTS

| | | | |
|---|---|---|---|
| 10,491,576 B1 * | 11/2019 | Pfannenschmidt | ... H04L 63/061 |
| 2006/0005049 A1 * | 1/2006 | Randell | ............... G06F 21/6209 713/193 |
| 2010/0266132 A1 * | 10/2010 | Bablani | ............... H04W 12/126 380/286 |
| 2016/0154963 A1 * | 6/2016 | Kumar | ................... H04L 9/0822 713/189 |

* cited by examiner

*Primary Examiner* — Thaddeus J Plecha (57) ABSTRACT

Systems, methods, and software technology for managing keys used to encrypt data at-rest and decrypt the data when serving requests for the data. In an implementation, a data service receives a request for data that has been encrypted at rest using a data key, wherein the data key has been encrypted using a policy key, and wherein the policy key has been encrypted using a root key. When the root key is unavailable, the data service requests a key service to decrypt the policy key using an alternative root key. When the data service receives the policy key in an unencrypted state from the key service, it decrypts the data key using the policy key and decrypts the data using the data key.

20 Claims, 9 Drawing Sheets

ENHANCED KEY AVAILABILITY FOR DATA SERVICES

RELATED APPLICATIONS

The present application is related to and claims the benefit of priority to U.S. Provisional Application No. 62/736,049, filed on Sep. 25, 2018, and entitled "Enhanced Key Availability for Data Services," which is hereby incorporated by reference in its entirety.

TECHNICAL BACKGROUND

Modern data services routinely encrypt data at-rest, such as email, documents, photos, records, and the like. That is, data is stored in an encrypted form when not being used, meaning that it must be unencrypted when being retrieved and served in the context of providing a data (or information) service to end-users. Data may also be encrypted in-transit, such as when email is being sent or received, although such encryption operates at a different layer than encrypting data at-rest.

Data may be encrypted at rest using a data key. The data key is the key that is used to directly encrypt the data before it is written to persistent storage. However, the data key itself may be encrypted using a policy key to prevent it from being compromised. In addition, the policy key may be encrypted using a root key to prevent its theft, misuse, or the like. The root key may be associated with a given tenant of the data service, such as an enterprise, organization, individual, or the like.

Unfortunately, the root key may become unavailable such that neither the policy key nor the data key can be unencrypted. Of course, without the unencrypted data key, the data itself cannot be unencrypted, meaning the loss of the root key jeopardizes the ability of a tenant to access their data.

Overview

Technology is disclosed herein for encrypting and decrypting data at rest. In an implementation, a data service encrypts data using a data key and stores the encrypted data at-rest. The data service also protects the data key by encrypting it using a policy key. Thus, the data may not be unencrypted without using the policy key to decrypt the data key.

The policy key is protected by encrypting it with a root key stored in a key service. In addition, the same policy key (or a copy thereof) is encrypted using an alternative root key which is also stored in the key service. The data service, in response to a request for the data, attempts to obtain the policy key from the key service in order to decrypt the data key. However, if the root key is not available, then the key service is able to decrypt the other encrypted instance of the policy key using the alternative root key.

The key service may then return the policy key in an unencrypted state to the data service. The data service then decrypts the data key using the policy key and can decrypt the data itself using the data key. In this manner, the unavailability of the root key does not prevent the data from being accessed. Rather, the alternative root key may be leveraged to decrypt the policy key, so as to gain access to the data key and the data.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations disclosed herein enhance the encryption and decryption of data at rest. Namely, tenants of a data service may be given control over their root keys without concern that loss, mismanagement, or other such unavailability event cause the tenant to lose access to their data. This is accomplished by creating an alternative root key in parallel with a tenant's root key. Just as the tenant's root key is used to encrypt a policy key for the tenant, the alternative root key may be used to encrypt a copy of the policy key.

Data is encrypted at rest using a data key. The data key is encrypted using the policy key which, as discussed above, is encrypted using the root key. The copy of the policy key is also encrypted but using the alternative root key. In the event that the root key becomes unavailable, the alternative root key may be used to decrypt the copy of the policy key. The unencrypted policy key may then be used to decrypt the data key. The data key in its unencrypted state may then be used to decrypt the encrypted data, thereby rendering the encrypted data at rest accessible in the event of an unavailable root key.

Figure 1:
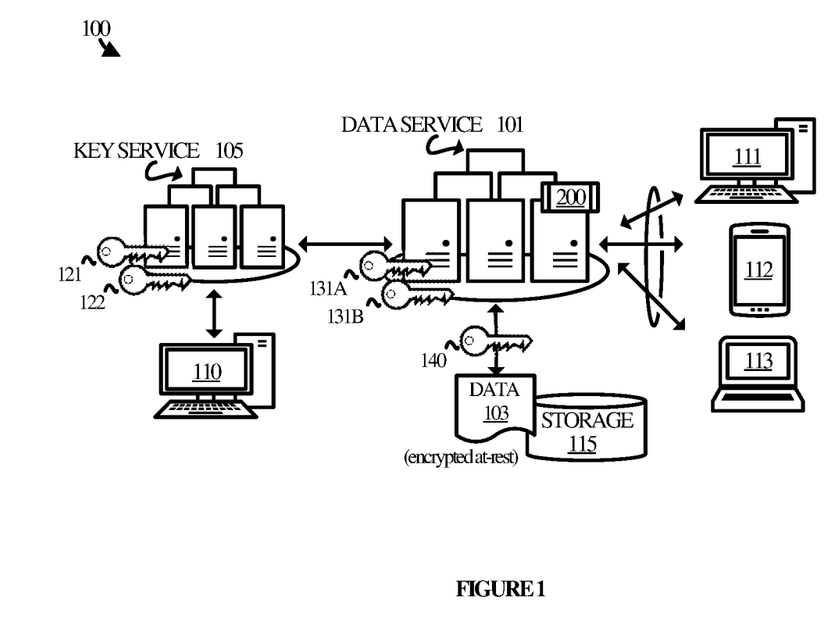
FIG. 1 illustrates an operational environment 100 in an implementation of key management and availability for data services.

FIG. 1 illustrates an operational environment 100 in an implementation of enhanced key management and availability for data services. Operational environment 100 includes data service 101 and key service 105.

Figure 9:
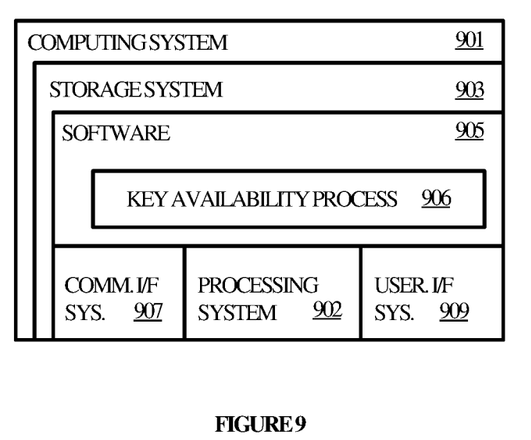
FIG. 9 illustrates a computing system suitable for implementing the various operational environments, architectures, processes, scenarios, and sequences discussed below with respect to the Figures.

Data service 101 is representative of any service that may be provided to end points, such as devices 111, 112, and 113, and that encrypts data 103 at rest. Data 103 is persisted in its encrypted state in storage 115. Examples of data service 101 include, but are not limited to, email services, cloud storage services, social network services, productivity services (e.g. document, spreadsheet, and presentation services), gaming services, communication services, or any other type of data service, variation, or combination thereof. Data service 101 may be implemented in the context of a data center and on one or more physical or virtual computing systems, of which computing system 901 in FIG. 9 is generally representative.

Key service 105 is representative of any service that may provide encryption keys to data service 101 and its users/enterprises/customers for the purpose of encrypting data at rest. Key service 105 may also be implemented in the context of a data center and on one or more physical or virtual computing systems of which computing system 901 is broadly representative. Key service 105 may be implemented in a stand-alone fashion with respect to data service 101 or may be integrated with data service 101 (or any other service).

In operation, key service 105 produces a root key 121 for use by an enterprise, organization, end-user, or the like. The root key 121 may be managed by administrative personnel associated with the enterprise or organization via computing device 110. The root key 121, while created by key service 105, may be controlled by the administrative personnel by way of access credentials (e.g. username and password, biometrics, certificates, etc.) that are used to access the root key.

Root key 121 is used to encrypt a policy key 131A that is maintained in data service 101 or elsewhere, e.g. within key service 105. The policy key 131A is associated with a tenancy of the enterprise or organization within data service 101. Thus, there may be many policy keys hosted by data service 101 in association with the many tenancies hosted in the service. Policy key 131A is encrypted with root key 121 so that the policy key cannot be discovered, hacked, and the like.

Policy key 131A itself is used to encrypt a data key 140. Data key 140 in its unencrypted state is used to encrypt data 103. Thus, when data is stored by data service 101 and resides at-rest, it is encrypted using data key 140. However, data key 140 is protected by encrypting it with policy key 131A. Thus, data key 140 is encrypted by policy key 131A, which in turn is encrypted by root key 121.

In an example read operation, one or more of devices 111, 112, and 113 may request data from data service 101. This may happen in the context of retrieving email, viewing photos, opening documents, or any other type of data operation.

In order to successfully read data 103, it must be unencrypted. To do so, data key 140 must be unencrypted with policy key 131A but policy key 131A must first be unencrypted with root key 121. Accordingly, in response to a request to read all or a portion of data 103, data service 101 sends a request to key service 105 with policy key 131A in its encrypted state to be unencrypted. Key service 105 receives the request and decrypts policy key 131A with root key 121 and returns policy key 131A in its unencrypted state to data service 101.

Data service 101 uses policy key 131A in its unencrypted state to decrypt data key 140. Alternatively, data service 101 could send data key 140 to key service 105 to be unencrypted with policy key 131A. For example, data service 101 could send data key 140 and policy key 131A—both in their encrypted states—to key service 105. Key service 105 could then decrypt policy key 131A with the root key and then decrypt data key 140 with the unencrypted version of policy key 131A. Data service 101 then uses data key 140 in its unencrypted state to decrypt data 103. Data 103 in its unencrypted form can be sent to the requesting computing device.

(It may be appreciated that the communications between the computing devices and data service 101, and between data service 101 and key service 105, may also be encrypted. However, such encryption is at a different layer than the at-rest encryption that is the focus of the present disclosure.)

Unfortunately, root key 121 may become unavailable in some situations. For instance, the administrator of root key 121 may depart from a position of employment, forget his or her access credentials, misappropriate the access credentials, or otherwise render root key 121 unavailable for purposes of decrypting policy key 131A.

Technology is disclosed herein for mitigating the problem of inaccessible or unavailable root keys. In addition to root key 121, an alternative root key 122 is created in parallel with root key 121 at the time of its generation. Alternative root key 122 is used to encrypt an alternative version of policy key 131A, represented by policy key 131B. It may be appreciated that policy key 131A and policy key 131B are the same (copies) when in their unencrypted states. However, as root key 121 and alternative root key 122 differ, policy key 131A and alternative policy key 131B will differ in their encrypted states.

Thus, policy key 131A is still used to encrypt data key 140, which is still used to encrypt data 103. However, if root key 121 becomes unavailable, alternative root key 122 may be used to decrypt policy key 131B. policy key 131B may then be used to decrypt data key 140, which is then used to decrypt data 103.

Figure 2:
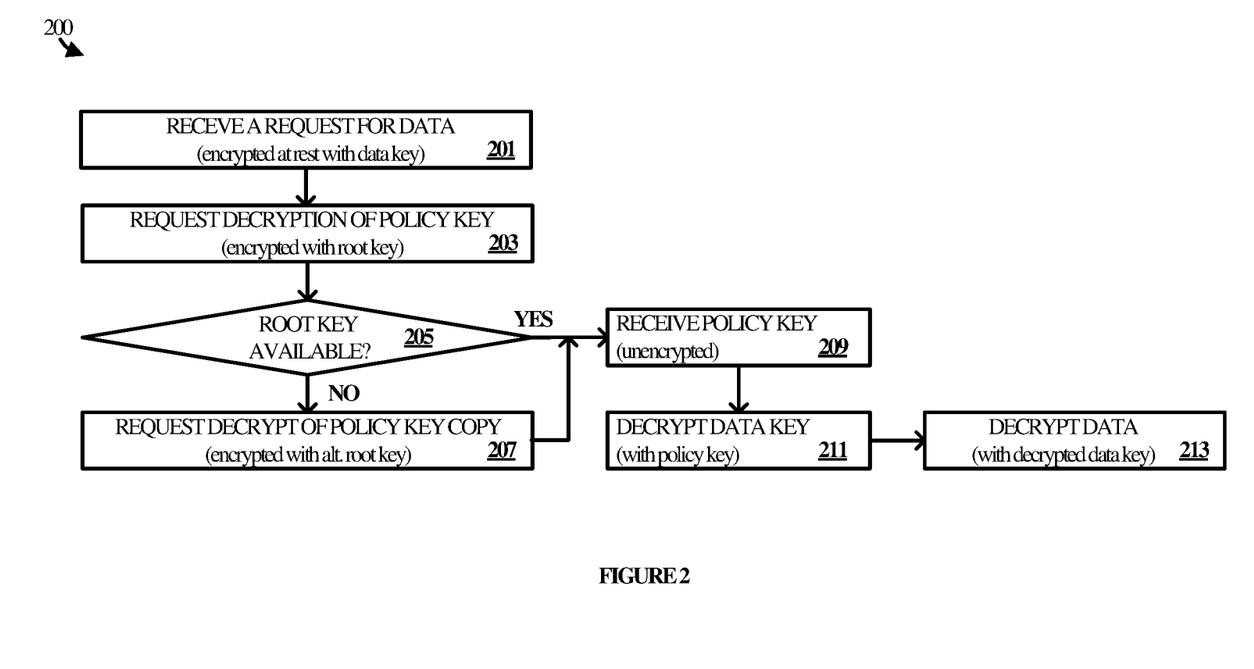
FIG. 2 illustrates a key availability process in an implementation.

Data service 101 employs a key process 200 when handling requests for data to ensure that data at rest can be successfully decrypted. Referring to FIG. 2, key process 200 may be implemented in program instructions in the context of any of the software applications, modules, components, or other such programming elements deployed in the various elements of data service 101, such as servers, switches, and routers. The program instructions direct the underlying physical or virtual computing system or systems to operate as follows, referring parenthetically to the steps in FIG. 2 in the context of operational environment 100.

To begin, data service 101 receives a request for data (step 201). It may be assumed that the data has been encrypted at rest using data key 140. Next, data service 101 requests key service 105 to decrypt policy key 131A (step 203). This may include data service 101 sending policy key 131A in its encrypted state to key service 105. Data service 101 may also provide a certificate, credentials, or other such information with which key service 105 may authenticate data service 101.

Data service 101 then determines whether the root key 121 is available (step 205), which may be indicated by the response data service 101 receives from key service 105. For example, key service 105 returning policy key 131 in an unencrypted state would indicate that root key 121 was available, whereas returning an error would or other such message would indicate that root key 121 was unavailable.

If root key 121 is available, then data service 101 receives policy key 131 (step 209) and proceeds to decrypt data key 140 (step 211). Data service 101 may then decrypt data 103 with data key 140 (step 213).

However, if root key 121 is not available, then data service 101 sends a request to key service 105 to decrypt policy key 131B (step 207). Key service 105 returns the unencrypted version of policy key 133B, which data service 101 then uses to decrypt data key 140 (step 209). With the unencrypted version of data key 140 in hand, data service 101 may proceed to decrypt data 103 with data key 140 (step 309) and then can decrypt data 103 with data key 140 (step 213).

Figure 3:
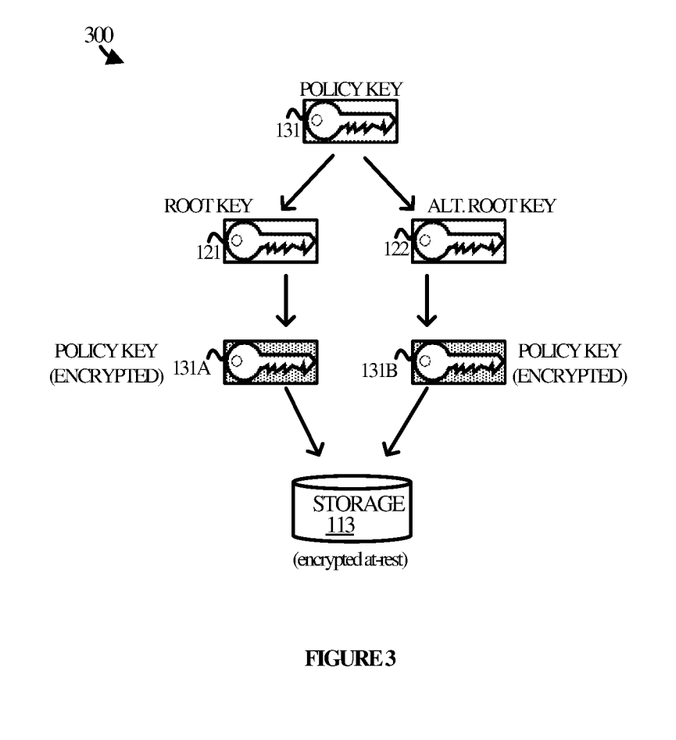
FIG. 3 illustrates an availability architecture and associated operations for protecting a policy key in an implementation.

FIG. 3 briefly illustrates an availability architecture 300 and the functional relationship between the various keys employed by key process 200 to protect a policy key. Availability architecture 300 includes policy key 131, root keys 121 and 122, and encrypted instances of policy key 131 represented by policy keys 131A and 131B.

Policy key 131 may be encrypted using root key 121, resulting in policy key 131A, which is an encrypted instance of policy key 131. Policy key 131 (or a copy thereof) may also be encrypted using alternative root key 122, resulting in policy key 131B, which is a different encrypted instance of policy key 131.

Both policy key 131A and policy key 131B may be persisted to storage where they reside at rest in their encrypted states. Policy key 131 in its unencrypted state is not persisted to storage 115 but rather resides in memory only. Storage 115 may be the same or different physical storage than that used to store data 103.

Figure 4:
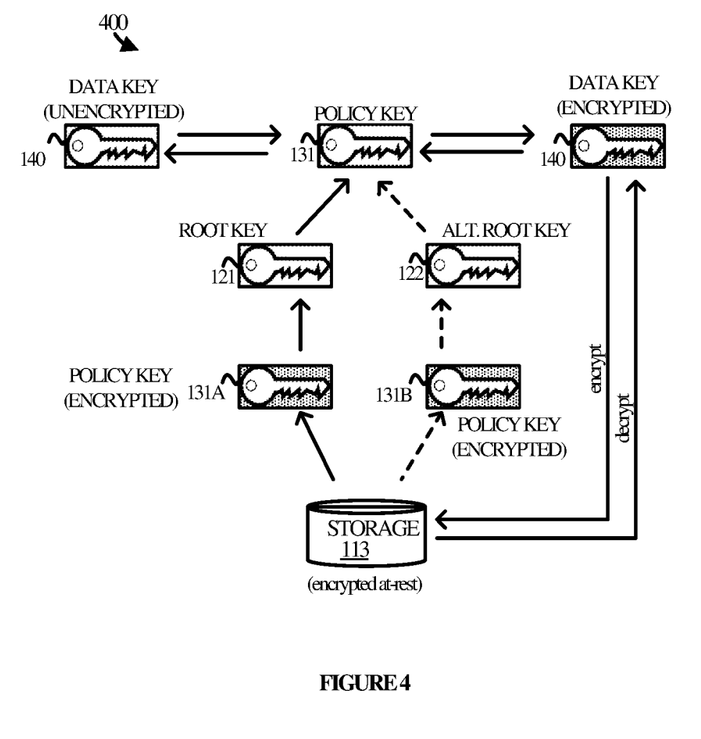
FIG. 4 illustrates the availability architecture of FIG. 3 and associated operations protecting a data key in an implementation.

FIG. 4 briefly illustrates an availability architecture 400 and the functional relationship between the various keys employed by key process 200 to protect a data key. Availability architecture 400 includes policy key 131, root keys 121 and 122, and encrypted instances of policy key 131 represented by policy key 131A and policy key 131B. Availability architecture 400 also includes data key 140.

Policy key 131 in its unencrypted state is obtained via policy key 131A or policy key 131B, depending upon the availability or unavailability of root key 121. If root key 121 is available, then policy key 131A is used to produce policy key 131 by having it decrypted with root key 121. If root key 121 is not available, then policy key 131B is used to produce policy key 131 by having it decrypted with alternative root key 122.

Once policy key 131 has been decrypted, it may be used to encrypt (or decrypt) data key 140. Data key 140 is persisted to storage 115 in its encrypted state and may be read from storage 115 in its encrypted state. Data key 140 is encrypted and decrypted in memory using policy key 131 and is not persisted to storage 115 in its unencrypted state. Likewise, policy key 131 resides only in memory and is not persisted to storage 115.

Figure 5:
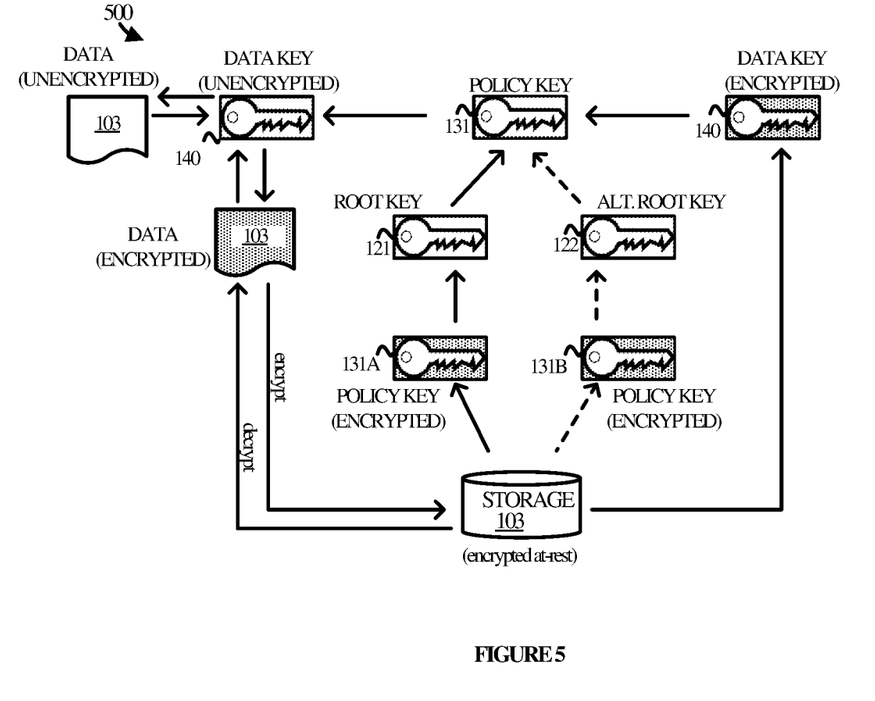
FIG. 5 illustrates the availability architecture of FIG. 3 and FIG. 4 and associated operations for protecting data in an implementation.

FIG. 5 briefly illustrates an availability architecture 500 and the functional relationship between the various keys employed by key process 200 to protect data. Availability architecture 500 includes policy key 131, root keys 121 and 122, encrypted instances of policy key 131, and data key 140. Availability architecture 500 also includes data 103.

As described above with respect to FIG. 4, policy key 131 is obtained via policy key 131A and root key 121 or—depending upon the availability of root key 121—via policy key 131B and alternative root key 122. Policy key 131 may then be used to decrypt data key 140.

Data key 140 in its unencrypted state may be used to protect data 103. That is, data 103 may be encrypted using data key 140 and persisted to storage 115 in its encrypted state. Data 103 may also be read from storage 115 in its encrypted state and decrypted using data key 140. Data 103 in its unencrypted state may then be provided to one or more applications that requested the data from data service 101.

Figure 6:
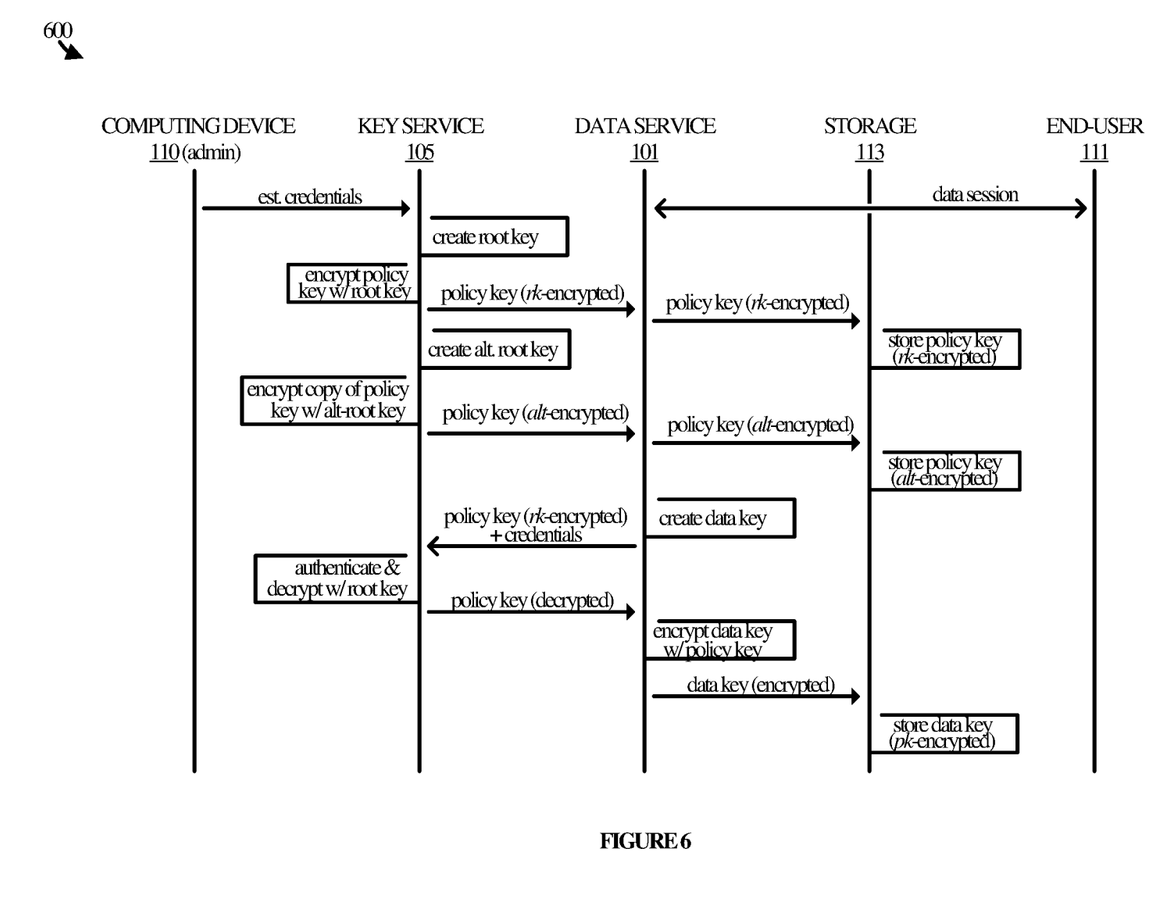
FIG. 6 illustrates an operational scenario related to protecting a policy key in an implementation.

FIG. 6 illustrates an operational scenario 600 for protecting a policy key in an implementation. In operation, personnel operating computing device 110 establish and maintain credentials with key service 105. The credentials may be, for example, a username and password combination, a personal identification number (PIN), or some other type of information with which the user may access key service 105. An example of key service 105 is the Azure Key Vault provided by Microsoft®.

The user interfaces with key service 105 via computing device 110 to create a root key associated with a tenancy in data service 101. The root key may be stored in a hardware security module (HSM) within key service that may only be accessed by the resources (e.g. applications) that have been granted access. The root key is associated with a data encryption policy (DEP) for the tenant, which associates a mailbox or other such content repository with the root key. Key service 105 encrypts a policy key using the root key and provides the encrypted policy key to data service 101. The policy key may sometimes be referred to as a DEP key.

Data service 101 calls to key service 105 to create an alternative root key. Key service 105 responsively creates the alternative root key and encrypts the policy key using the alternative root key. The (different) encrypted instance of the policy key is returned to and retained within data service 101, which may provide the policy key to key service 105 at the time that it needs to be decrypted.

End users represented by end user 111 establish connections and sessions with data service 101 to obtain the application(s) and/or service(s) provided by data service 101 such as email, productivity, gaming, and communication applications and services. User data is generated in the context of the sessions and is persisted to storage 115 and the user data is protected using a data key. The data key may be created by data service 101 (or users interfacing with data service 101) and it is protected with the policy key.

In order to obtain policy key in an unencrypted form, data service 101 sends a request to key service 105. The request includes the encrypted instance of the policy key that was encrypted using the root key. The request may also include credentials such as a security certificate or other information that can be authenticated by key service 105. It is assumed for exemplary purposes that the request is authenticated, and thus key service is able to decrypt the encrypted instance of the policy key. Key service replies to the request with the policy key in its unencrypted form, thereby allowing data service 101 to encrypt the data key. Once encrypted, data service 101 persists the data key to storage 115.

It may be appreciated that the original root key is available in operational scenario 600. However, the root key may be unavailable in some scenarios. In such scenarios, data service 101 would send the other encrypted instance of the policy key to key service 105 to be decrypted using the alternative root key. Key service 105 would reply with the unencrypted policy key, which data service 101 would then use to encrypt the data key.

Figure 7:
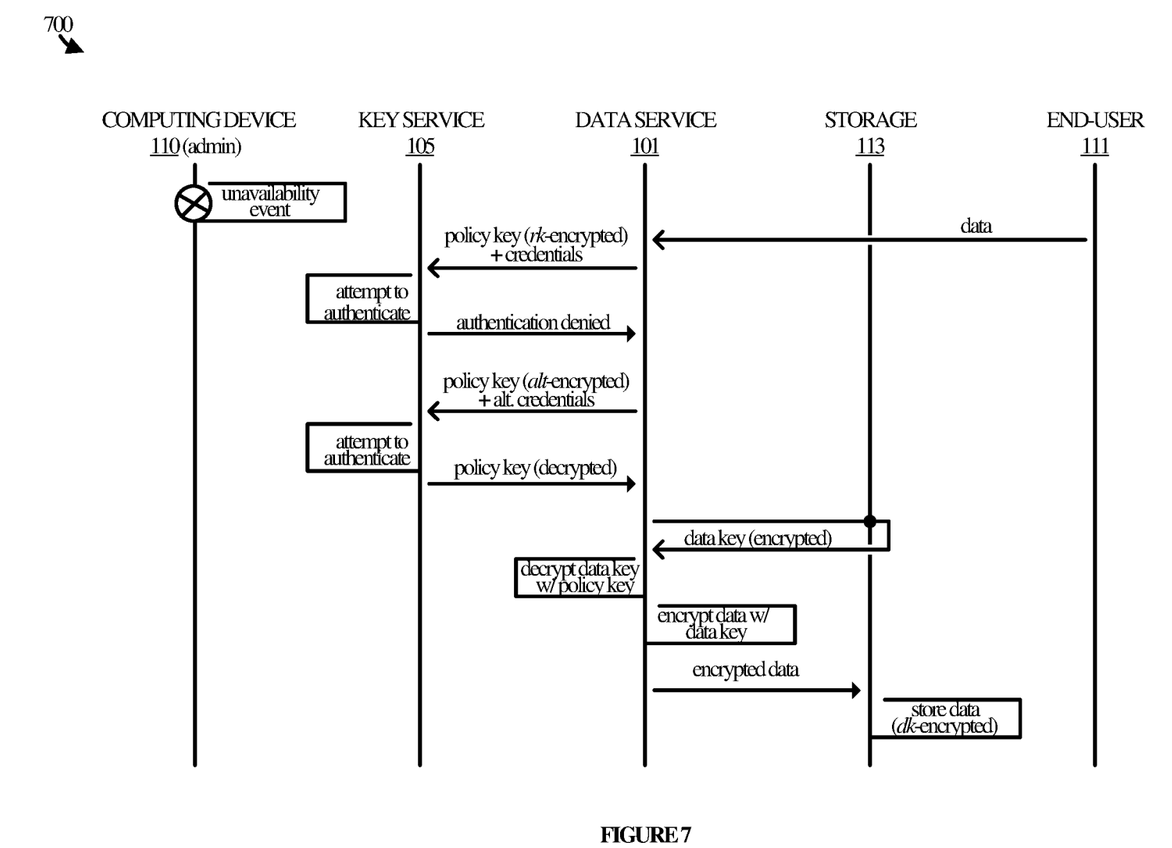
FIG. 7 illustrates an operational scenario related to storing data at-rest in an implementation in an implementation.

FIG. 7 illustrates an operational scenario 700 in which data is protected and stored at rest in storage 115. In operation, an unavailability event occurs with respect to computing device 110 or—more specifically—they root key(s) associated with the tenant. For instance, login credentials for key service 105 may have been lost, discarded, or otherwise rendered inoperative.

In the meantime, end user 111 sends data to data service 101 to be persisted to storage 115. For example, end user 111 may upload a photo or a document, send or receive an email, or otherwise generate data that needs to be stored and encrypted at rest.

Data service 101 responds to the request by sending the encrypted instance of the policy key to key service 105, along with authenticating credentials. Key service 105 attempts to authenticate the request but, because of the unavailable event, the authentication attempt fails. Key service 105 notifies data service 101 of the failure accordingly.

Data service 101 responds to the failure by submitting a new request to key service 105 with the different encrypted instance of the policy key. Key service 105 authenticates the request by virtue of data service 101 having been denied initially or based on some other setting, criteria, or condition. Key service 105 also decrypts the different instance of the policy key using the alternative root key and provides the unencrypted policy key to data service 101.

Data service 101 receives the policy key from key service 105 and responsively retrieves the encrypted data key from storage 115. Data service 101 decrypts the data key with the policy key and uses it (the data key) to encrypt the data provided by end user 111. The data may then be persisted to storage 115 in its encrypted state.

Figure 8:
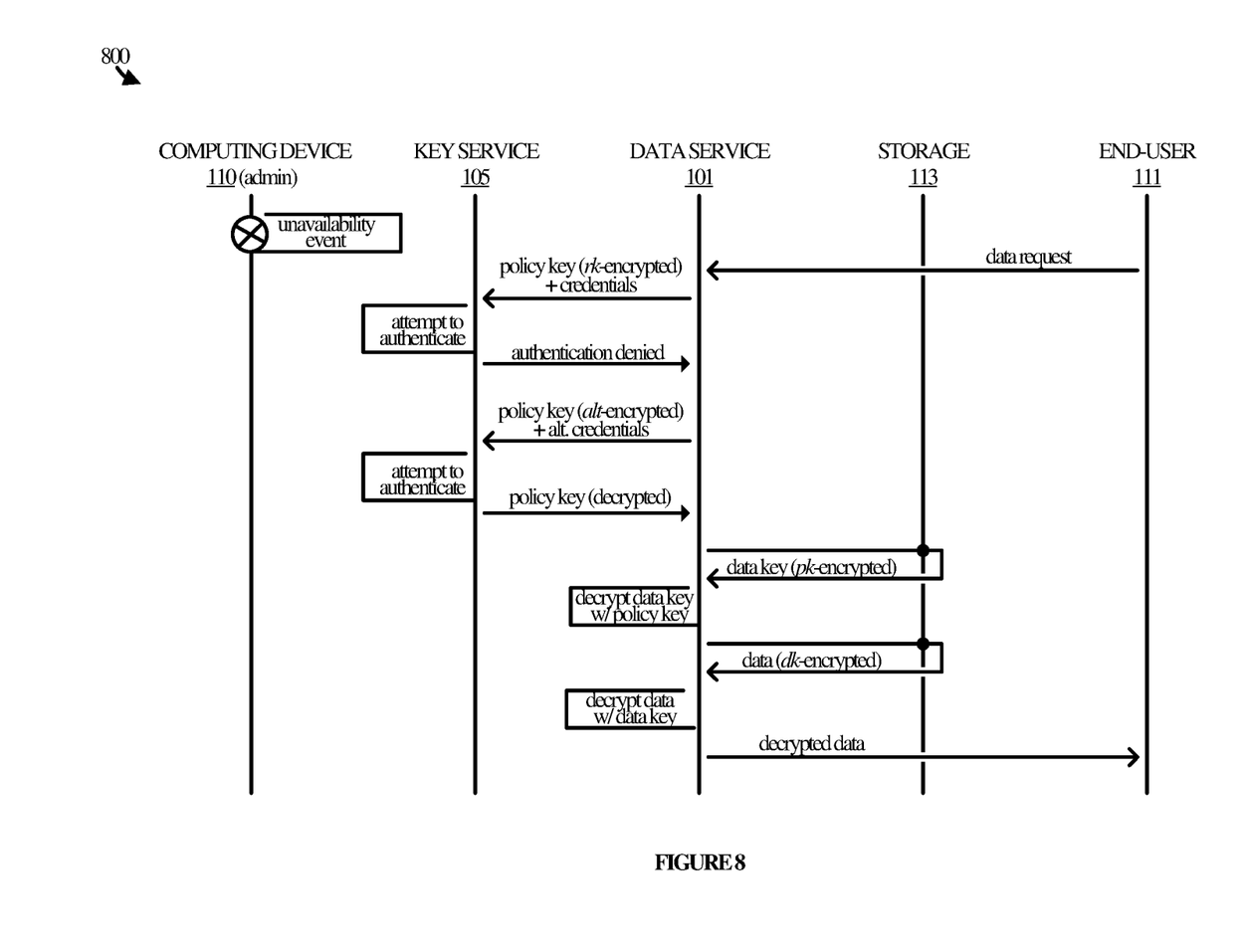
FIG. 8 illustrates an operational scenario related to retrieving data at-rest in an implementation.

Finally, FIG. 8 illustrates an operational scenario 800 related to retrieving encrypted data from storage 115. In operation, an unavailability event occurs with respect to computing device 110 and/or the tenant access to key service 105. However, end users may continue to request data from data service 101. Data service 101 responds to a given request by sending the encrypted instance of the policy key to key service 105 and optionally with authenticating credentials. Key service 105 attempts to authenticate the request but, because of the unavailable event, the authentication attempt fails. Key service 105 notifies data service 101 of the failure accordingly.

Data service 101 responds to the failure by submitting a new request to key service 105 with the different encrypted instance of the policy key. Key service 105 authenticates the request by virtue of data service 101 having been denied initially or based on some other setting, criteria, or condition. Key service 105 also decrypts the different instance of the policy key using the alternative root key and provides the unencrypted policy key to data service 101.

Data service 101 receives the policy key from key service 105 and responsively retrieves the encrypted data key from storage 115. Data service 101 decrypts the data key with the policy key and uses it (the data key) to decrypt the data read from storage 115. The data may then be sent to end user 111 in reply to its initial data request.

FIG. 9 illustrates computing system 901, which is representative of any system or collection of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes key process 906, which is representative of the processes discussed with respect to the preceding FIGS. 1-3, including key process 200. When executed by processing system 902 to enhance data encryption and decryption, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing key process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include key process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate data encryption and decryption. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A method of operating a data service, the method comprising:
   receiving a request for data, wherein the data is stored at-rest in an encrypted state;
   requesting a key service to decrypt an encrypted instance of a policy key with which to decrypt a data key used to decrypt the data;
   when a root key used to decrypt the encrypted instance of the policy key is unavailable, requesting the key service to decrypt a different encrypted instance of the policy key with an alternative root key used to generate the different encrypted instance of the policy key;
   receiving the policy key in an unencrypted state from the key service;
   decrypting the data key using the policy key;
   decrypting the data using the data key; and
   replying to the request with the data in an unencrypted state.

2. The method of claim 1 further comprising providing the root key to a tenant associated with the data and storing the alternative root key separately from the root key.

3. The method of claim 2 further comprising generating the root key and the alternative root key, wherein the root key and the alternative root key differ relative to each other.

4. The method of claim 3 further comprising encrypting the policy key with the root key, resulting in the encrypted instance of the policy key.

5. The method of claim 4 further comprising encrypting a copy of the policy key with the alternative root key, resulting in the different encrypted instance of the policy key.

6. The method of claim 5 further comprising encrypting the data key with the policy key.

7. The method of claim 6 further comprising encrypting the data with the data key.

8. The method of claim 7 further comprising storing the data at-rest in the encrypted state.

9. A computing apparatus comprising:
one or more computer readable storage media;
a processing system operatively coupled to the one or more computer readable storage media; and
program instructions stored on the one or more computer readable storage media that, when executed by the processing system, direct the computing apparatus to at least:
in response to a request for data, wherein the data is stored at-rest in an encrypted state, request a key service to decrypt an encrypted instance of a policy key with which to decrypt a data key used to decrypt the data;
when a root key used to decrypt the encrypted instance of the policy key is unavailable, request the key service to decrypt a different encrypted instance of the policy key with an alternative root key used to generate the different encrypted instance of the policy key;
receive the policy key in an unencrypted state from the key service;
decrypt the data key using the policy key;
decrypt the data using the data key; and
reply to the request with the data in an unencrypted state.

10. The computing apparatus of claim 9 wherein the program instructions further direct the computing apparatus to generate the root key and the alternative root key, wherein the root key and the alternative root key differ relative to each other.

11. The computing apparatus of claim 10 wherein the program instructions further direct the computing apparatus to encrypt the policy key with the root key, resulting in the encrypted instance of the policy key.

12. The computing apparatus of claim 11 wherein the program instructions further direct the computing apparatus to encrypt a copy of the policy key with the alternative root key, resulting in the different encrypted instance of the policy key.

13. The computing apparatus of claim 12 wherein the program instructions further direct the computing apparatus to encrypt the data key with the policy key.

14. The computing apparatus of claim 13 wherein the program instructions further direct the computing apparatus to encrypt the data with the data key and store the data at-rest in the encrypted state.

15. A method of operating a key service, the method comprising:
generating a root key with which to encrypt a policy key, wherein the policy key is used to encrypt a data key, and wherein the data key is used to encrypt data;
generating an alternative root key with which to encrypt a copy of the policy key;
encrypting the policy key with the root key, resulting in an encrypted instance of the policy key;
encrypting the copy of the policy key with the alternative root key, resulting in a different encrypted instance of the policy key; and
in response to a request to decrypt the policy key, determining, based on at least an attempt to authenticate a source of the request, an availability of the root key.

16. The method of claim 15 further comprising, in response to determining that the root key is available, decrypting the encrypted instance of the policy key with the root key.

17. The method of claim 15 further comprising, in response to determining that the root key is not available, decrypting the different encrypted instance of the policy key with the alternative root key.

18. The method of claim 15 further comprising determining that the root key is unavailable in response to failing to authenticate the source of the request for the policy key.

19. The method of claim 15 further comprising replying to the request with the policy key in an unencrypted state.

20. The method of claim 15 further comprising:
receiving a request to decrypt the data key using the policy key;
decrypting the data key; and
replying to the request to decrypt the data key with the data key.

* * * * *